United States Patent
Suciu et al.

(10) Patent No.: US 9,909,495 B2
(45) Date of Patent: Mar. 6, 2018

(54) GAS TURBINE ENGINE WITH DISTRIBUTED FANS WITH DRIVE CONTROL

(71) Applicant: United Technologies Corporation, Hartford, CT (US)

(72) Inventors: Gabriel L. Suciu, Glastonbury, CT (US); Wesley K. Lord, South Glastonbury, CT (US); Jesse M. Chandler, South Windsor, CT (US); Michael Winter, New Haven, CT (US); Michael E. McCune, Colchester, CT (US); William G. Sheridan, Southington, CT (US)

(73) Assignee: United Technologies Corporation, Farmington, CT (US)

( * ) Notice: Subject to any disclaimer, the term of this patent is extended or adjusted under 35 U.S.C. 154(b) by 658 days.

(21) Appl. No.: 14/600,487

(22) Filed: Jan. 20, 2015

(65) Prior Publication Data
US 2015/0361880 A1 Dec. 17, 2015

Related U.S. Application Data

(60) Provisional application No. 61/989,650, filed on May 7, 2014, provisional application No. 61/938,907, filed on Feb. 12, 2014, provisional application No. 61/937,153, filed on Feb. 7, 2014.

(51) Int. Cl.
| | |
|---|---|
| *F02C 3/10* | (2006.01) |
| *F02K 3/00* | (2006.01) |
| *B64D 27/12* | (2006.01) |
| *B64D 35/04* | (2006.01) |

(Continued)

(52) U.S. Cl.
CPC ............... *F02C 3/10* (2013.01); *B64D 27/12* (2013.01); *B64D 35/04* (2013.01); *F02C 3/107* (2013.01); *F02K 3/00* (2013.01); *F02K 3/077* (2013.01)

(58) Field of Classification Search
CPC .. F02C 3/067; F02C 3/10; F02C 3/107; F02C 7/36; F02C 7/047; F02K 3/04; F02K 3/072; F02K 3/065; F02K 3/068; F02K 3/075; F02K 3/077; F02K 3/12; F02K 3/00; B64D 35/04; B64D 27/12
See application file for complete search history.

(56) References Cited

U.S. PATENT DOCUMENTS

| | | | | |
|---|---|---|---|---|
| 3,054,577 A | * | 9/1962 | Wolf ................ | B64D 27/12 244/110 B |
| 4,446,696 A | * | 5/1984 | Sargisson ............ | F02C 6/206 60/226.3 |
| 5,161,369 A | | 11/1992 | Williams | |

(Continued)

*Primary Examiner* — William H Rodriguez
*Assistant Examiner* — William Breazeal
(74) *Attorney, Agent, or Firm* — Carlson, Gaskey & Olds, P.C.

(57) ABSTRACT

A gas turbine engine comprises a plurality of fan rotors. A gas generator comprises at least one compressor rotor, at least one gas generator turbine rotor, a combustion section, and a fan drive turbine downstream of at least one gas generator turbine rotor. A shaft is configured to be driven by the fan drive turbine. The shaft engages gears to drive the plurality of fan rotors. A system controls the amount of power supplied to the plurality of fan rotors. A method of operating a gas turbine engine is also disclosed.

8 Claims, 7 Drawing Sheets

(51) Int. Cl.
*F02K 3/077* (2006.01)
*F02C 3/107* (2006.01)

(56) References Cited

U.S. PATENT DOCUMENTS

| | | |
|---|---|---|
| 6,792,745 B2 | 9/2004 | Wojciechowski |
| 7,752,834 B2 | 7/2010 | Addis |
| 8,015,796 B2 | 9/2011 | Babu et al. |
| 2004/0025493 A1* | 2/2004 | Wojciechowski ........ F02K 3/06 60/224 |
| 2008/0098719 A1 | 5/2008 | Addis |
| 2009/0229243 A1 | 9/2009 | Guemmer |
| 2010/0031669 A1* | 2/2010 | Ensign ...................... F02C 3/10 60/784 |
| 2012/0131902 A1* | 5/2012 | Baughman .............. F02K 3/065 60/226.3 |

* cited by examiner

GAS TURBINE ENGINE WITH DISTRIBUTED FANS WITH DRIVE CONTROL

CROSS REFERENCE TO RELATED APPLICATION

This application claims priority to U.S. Provisional Patent Application Nos. 61/989,650, filed on May 7, 2014; 61/938,907, filed on Feb. 12, 2014; and 61/937,153 filed on Feb. 7, 2014.

BACKGROUND OF THE INVENTION

Gas turbine engines are known and typically include a fan delivering air as bypass air into a bypass housing and further delivering air into a core engine. Air in the core engine is directed into a compressor where it is compressed. The compressed air is then delivered into a combustion section where it is mixed with fuel and ignited. Products of this combustion pass downstream over turbine rotors, driving them to rotate.

Recently, it has been proposed to increase the diameter of the fan to, in turn, increase bypass ratios, or the volume of air delivered as bypass or propulsion air compared to the volume of air delivered into the core engine. However, the ability to make this increase is somewhat limited by the packaging envelope available on an aircraft.

It has been proposed to replace a single large diameter with a plurality of fan rotors. However, the proposals for driving the plurality of fan rotors have deficiencies in general.

SUMMARY OF THE INVENTION

In a featured embodiment, a gas turbine engine comprises a plurality of fan rotors. A gas generator comprises at least one compressor rotor, at least one gas generator turbine rotor, a combustion section, and a fan drive turbine downstream of at least one gas generator turbine rotor. A shaft is configured to be driven by the fan drive turbine. The shaft engages gears to drive the plurality of fan rotors. A system controls the amount of power supplied to the plurality of fan rotors.

In another embodiment according to the previous embodiment, the system includes a clutch between the shaft and the plurality of fan rotors that may be selectively opened.

In another embodiment according to any of the previous embodiments, the clutch is configured to be opened should it be determined that an associated fan rotor is damaged.

In another embodiment according to any of the previous embodiments, the clutch is configured to be opened to reduce power consumption by the gas turbine engine.

In another embodiment according to any of the previous embodiments, the shaft is also configured to drive an electric generator.

In another embodiment according to any of the previous embodiments, the clutch is configured to be opened to send more power to the electric generator.

In another embodiment according to any of the previous embodiments, the fan rotors are provided with variable inlet guide vanes, with the variable inlet guide vanes configured to be adjusted to control the amount of power.

In another embodiment according to any of the previous embodiments, the shaft is also configured to drive an electric generator.

In another embodiment according to any of the previous embodiments, the variable inlet guide vanes are configured to be adjusted to send more power to the electric generator.

In another embodiment according to any of the previous embodiments, the shaft is also configured to drive an electric generator.

In another featured embodiment, a method of operating a gas turbine engine comprises operating a gas generator including at least one compressor rotor and at least one gas generator turbine rotor and a combustion section. A fan drive turbine is driven by products of combustion from the gas generator. The fan drive turbine drives a shaft. The shaft engages gears and drives a plurality of fan rotors. The amount of power utilized by the plurality of fan rotors is controlled.

In another embodiment according to the previous embodiment, a clutch is positioned between the shaft and the plurality of fan rotors. The clutch is opened or closed to control the amount of power.

In another embodiment according to any of the previous embodiments, one of the clutches is opened when it is determined that an associated fan rotor is damaged.

In another embodiment according to any of the previous embodiments, at least one of the clutches is opened to reduce power consumption by the gas turbine engine.

In another embodiment according to any of the previous embodiments, the shaft also drives a generator to generate electricity.

In another embodiment according to any of the previous embodiments, the clutch is opened to send more power to the electric generator.

In another embodiment according to any of the previous embodiments, the fan rotors are provided with variable inlet guide vanes, and the variable inlet guide vanes are adjusted to control the amount of power.

In another embodiment according to any of the previous embodiments, the shaft also drives a generator to generate electricity.

In another embodiment according to any of the previous embodiments, the variable inlet guide vanes are adjusted to send more power to the electric generator.

In another embodiment according to any of the previous embodiments, the shaft also drives a generator to generate electricity.

These and other features may be best understood from the following drawings and specification.

DETAILED DESCRIPTION

Figure 1:
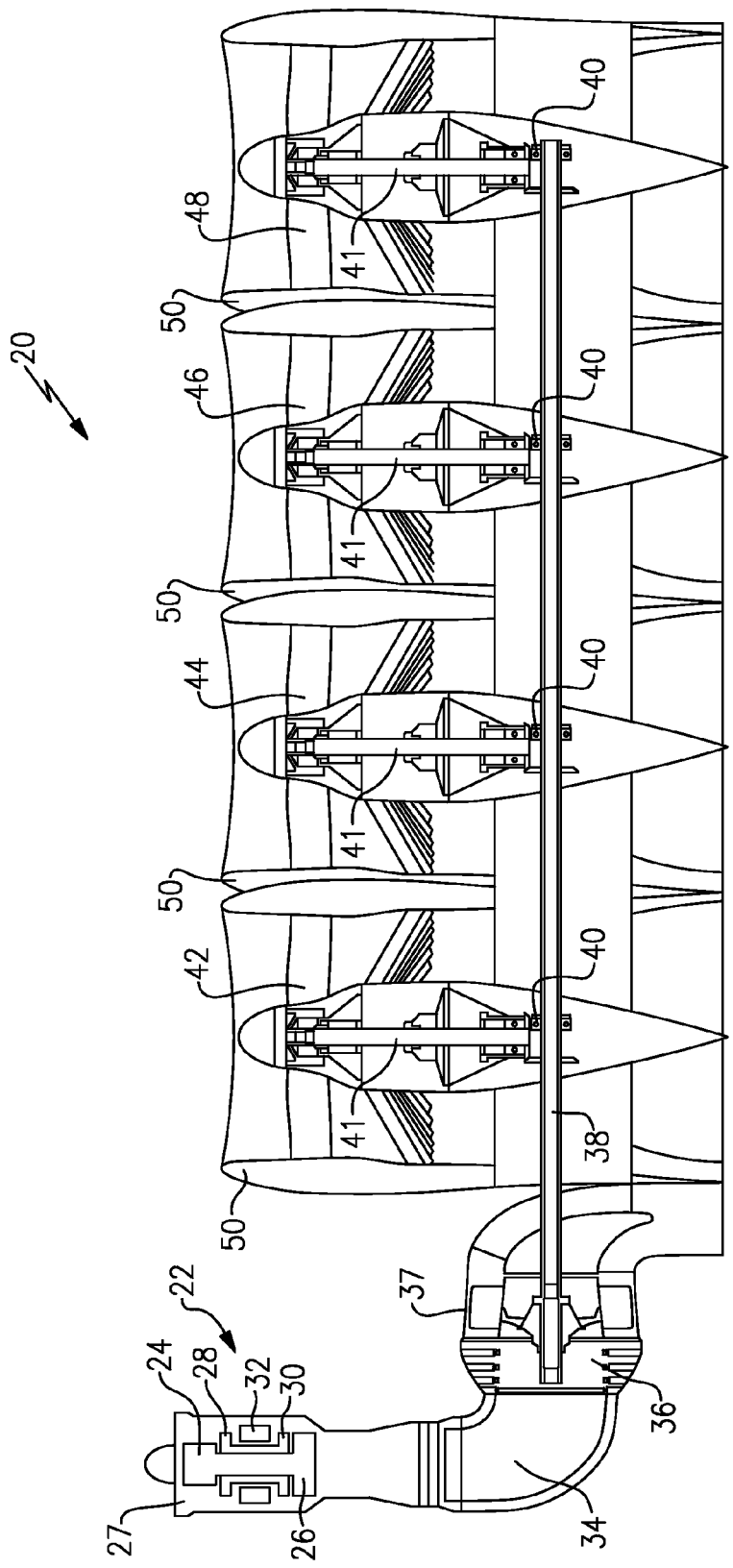
FIG. 1 schematically shows a gas turbine engine.

A gas turbine engine 20 is illustrated in FIG. 1 having a gas generator 22. The gas generator 22 may be a two spool gas generator having a low speed spool in which a first upstream compressor rotor 24 driven by a downstream or low pressure turbine rotor 26. A high speed spool includes a high pressure compressor rotor 28 rotating with a high pressure or upstream turbine rotor 30. A combustion section 32 is positioned intermediate rotors 28 and 30.

An exhaust duct 34 is positioned downstream of the gas generator 22 and receives products of combustion which have driven the turbine rotor 26 to rotate. These products of combustion pass across a fan drive turbine 36 mounted in a housing 37. The fan drive turbine 36 drives a shaft 38 that engages a plurality of bevel gears 40 to, in turn, drive shafts 41 associated with fan rotors 42, 44, 46 and 48. Each of the fan rotors 42, 44, 46 and 48 are mounted within separate housings 50.

By providing a single shaft 38, which drives at least four fan rotors and by utilizing a fan drive turbine 36 which is positioned downstream of the last turbine rotor 26 in a gas generator 22, this disclosure provides compact packaging, while still providing adequate drive for the fan rotors 42, 44, 46 and 48.

Figure 2:
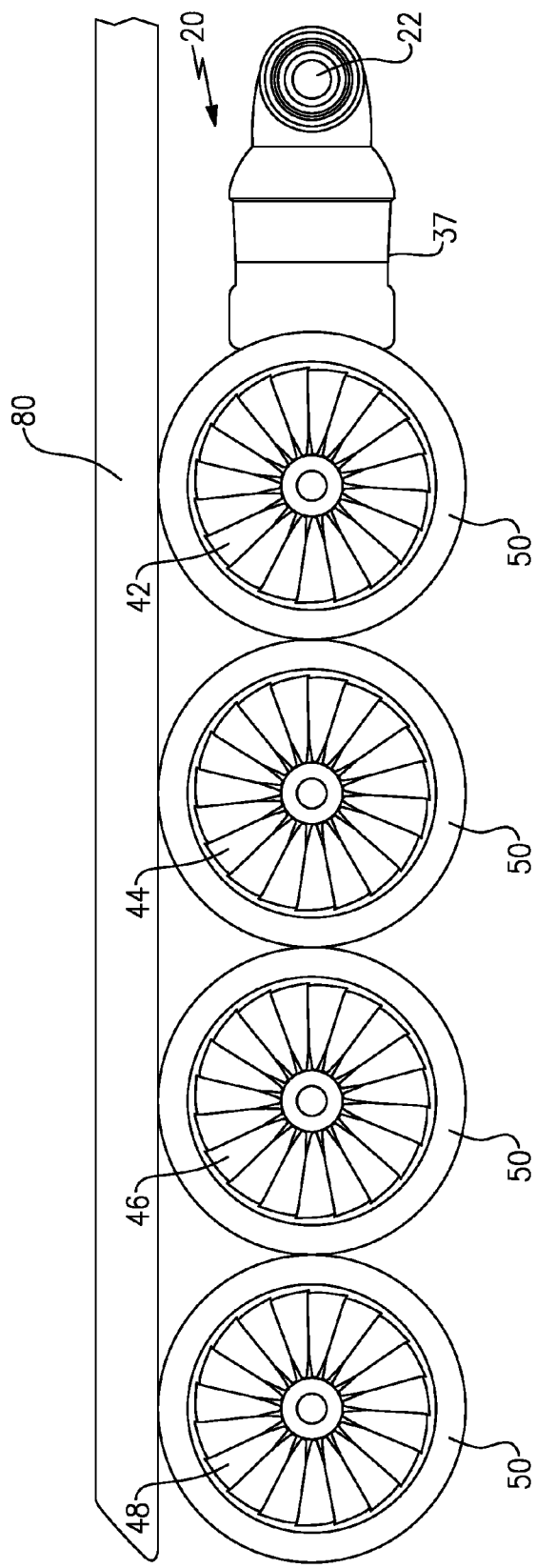
FIG. 2 is a front view of the FIG. 1 engine.

FIG. 2 is a front view of an aircraft wing 80, which may mount an engine such as engine 20. As shown, the gas generator is associated with the housing 37. The fan rotors 42, 44, 46 and 48 have diameters that are not unduly large, such that they fit within the packaging window of associated wing 80.

The engine as generally set forth above is better disclosed and claimed in co-pending U.S. patent application Ser. No. 14/597,510, entitled "Gas Turbine Engine With Distributed Fans," filed on even date herewith.

Figure 3:
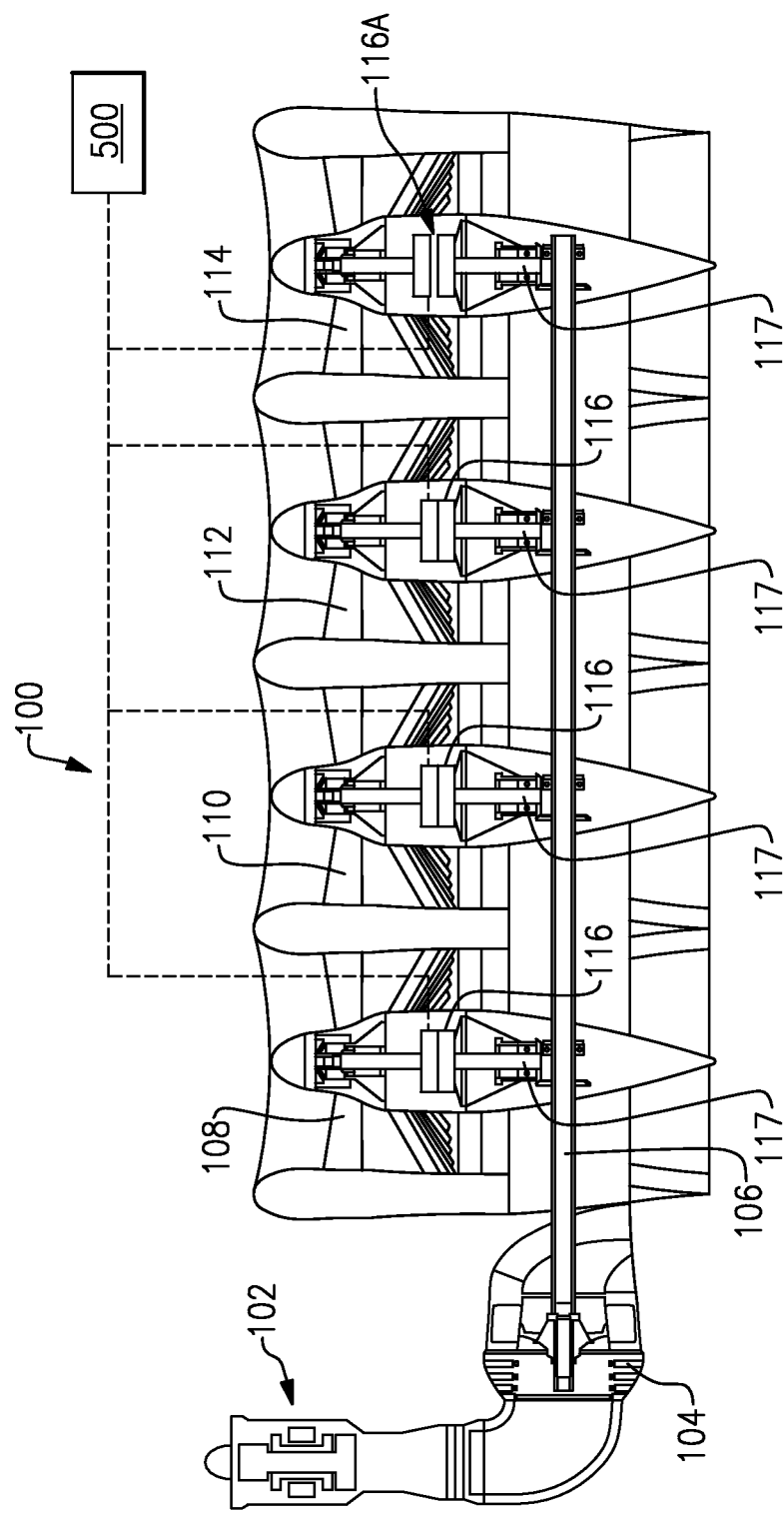
FIG. 3 shows a first embodiment.

With this type of engine, clutches may be provided to lower the power consumption as shown in FIG. 3. In engine 100, there is a gas generator 102 driving a fan drive turbine 104 to in turn drive a shaft 106 as in the above embodiment. Shaft 106 may drive a plurality of fan rotors 108, 110, 112 and 114. Each of the fan rotors is driven by a fan shaft 117 through a clutch 116. The clutches 116 may be opened (shown as 116A) to reduce power consumption when less power is needed, and thus eliminate loss associated with driving all or any fans when unnecessary. In addition, the clutches may be opened to reduce losses, such as when windmilling of the fans may occur.

Figure 4A:
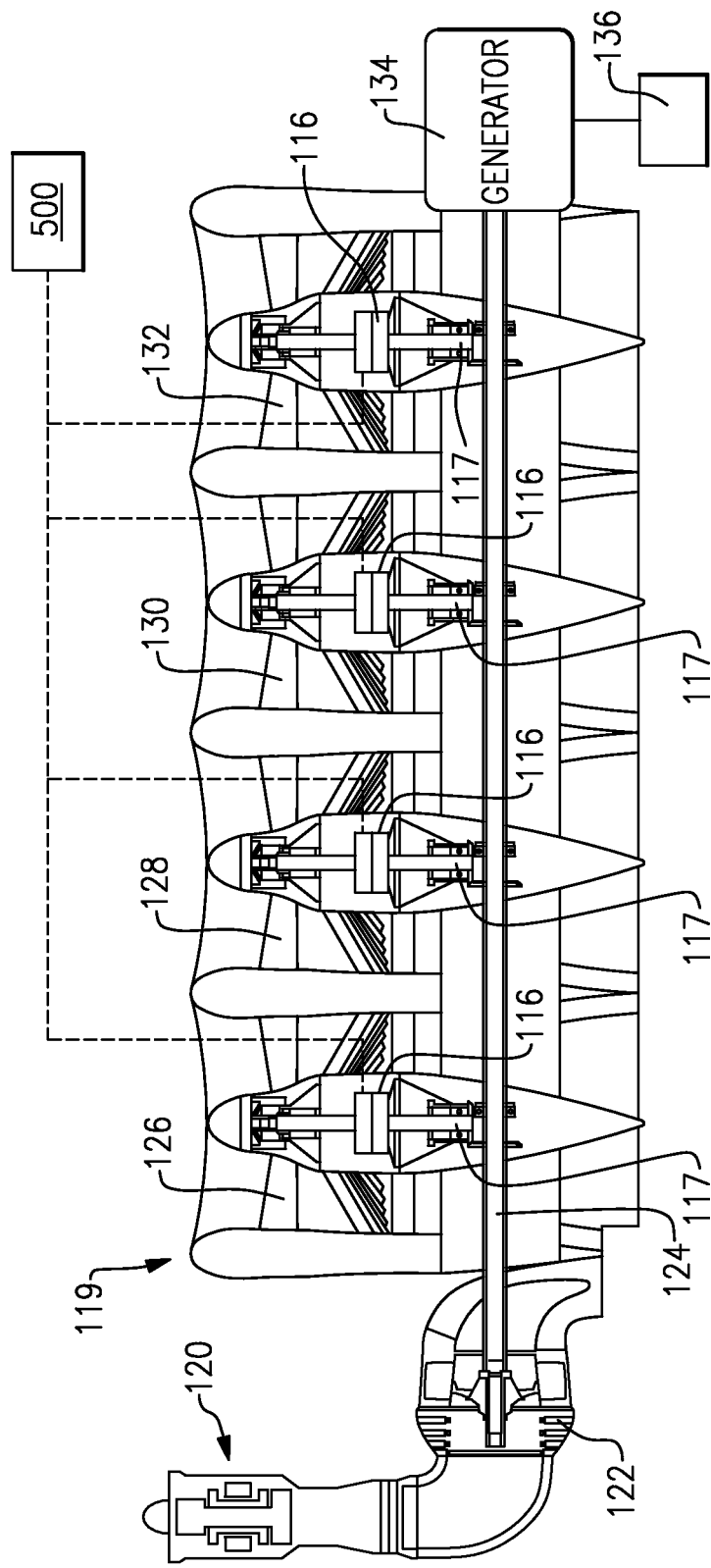
FIG. 4A shows a second embodiment.

FIG. 4A shows another engine embodiment 119 having a gas generator 120 driving the fan drive turbine 122 to in turn drive a shaft 124. Fan rotors 126, 128, 130 and 132 are all driven by shaft 117 through respective clutches 116. A generator 134 is shown also being driven by the shaft 124. The generator 134 supplies generated electricity to a use shown schematically at 136.

Figure 4B:
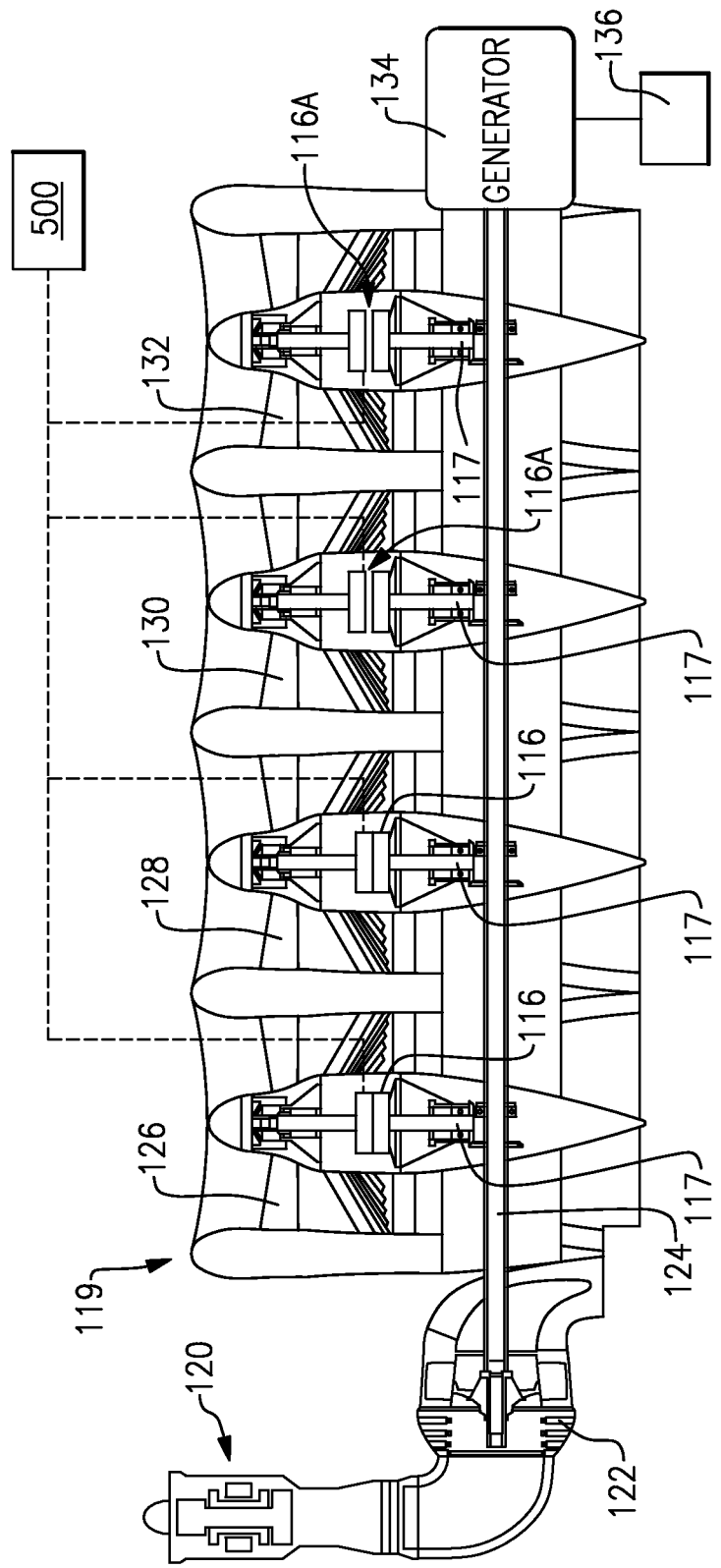
FIG. 4B shows the second embodiment in a "power saver" mode.

In high power situations, each of the clutches 116 may be closed to provide maximum propulsion. However, during lesser power situations, such as shown schematically in FIG. 4B, some of the clutches 116A may be opened. This reduces the force required to drive the fan rotors 126, 128, 130 and 132, and increases the power supplied to the generator 134 to increase the electricity for use 136.

Figure 5:
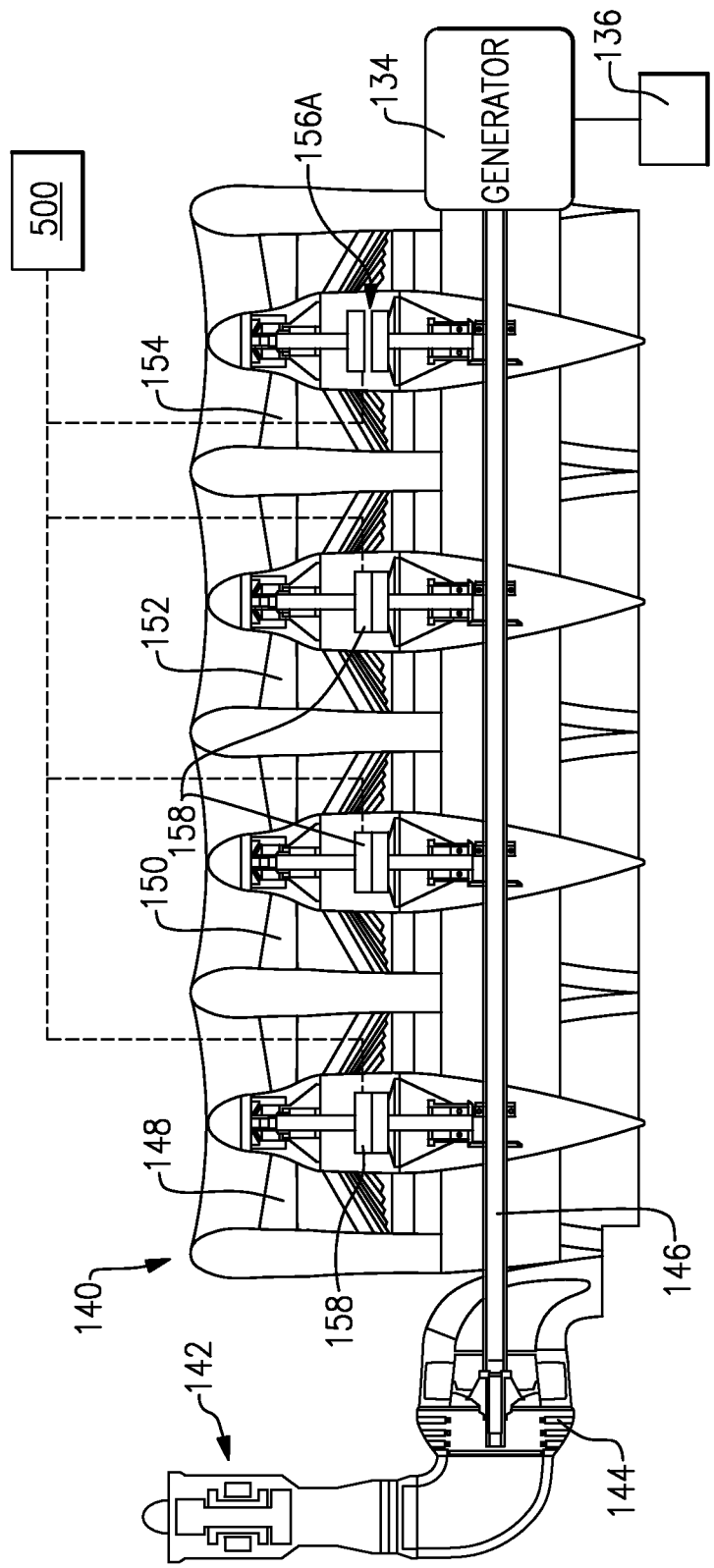
FIG. 5 shows another feature.

FIG. 5 shows yet another engine embodiment 144. Again, a gas generator 142 drives a fan drive turbine 144 to drive a shaft 146, and in turn drive fan rotors 148, 150, 152, and 154. As shown, clutches 158 are associated with the rotors 148, 150, and 152. However, the clutch 156A associated with the fan rotor 154 is shown open. This may occur such as when damage is detected to the fan rotor 154. A worker in the art would understand how fan damage may be detected by an associated control, which then opens the clutch.

Figure 6:
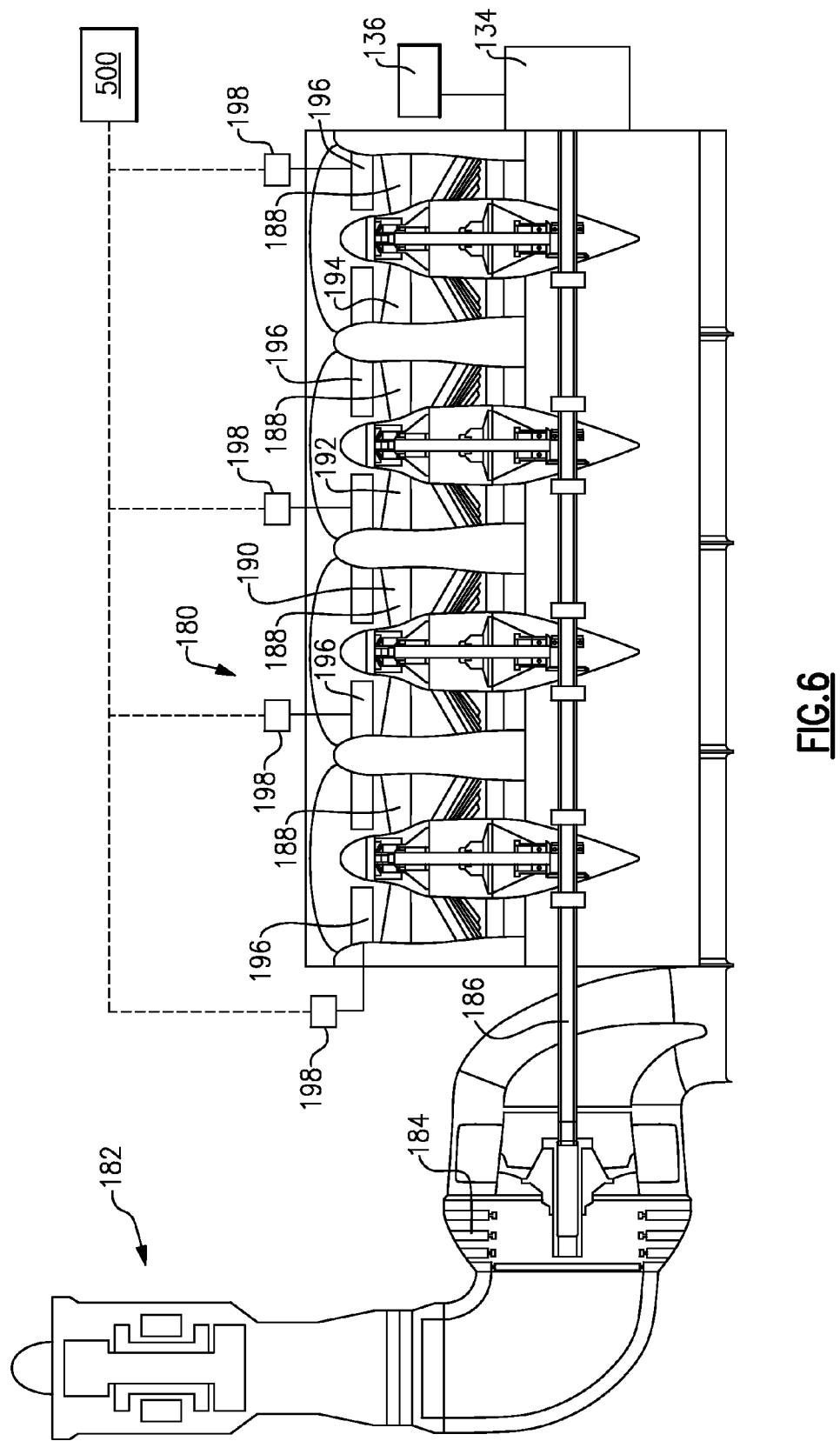
FIG. 6 shows another embodiment.

FIG. 6 shows an engine embodiment 180 having a gas generator 182 driving a fan drive turbine 184 to drive the shaft 186. Fan rotors 188, 190, 192 and 194 are shown being driven by the fan shaft 186. A variable inlet vane pack 196 is shown schematically having an actuator 198. As known, the orientation of the vanes 196 can be changed by the actuator 198 to reduce the flow of air across the fan rotors 188, 190, 192 and 194. In this manner, the amount of power being taken for driving the fan rotors can be controlled to in turn most efficiently drive the generator 134, and generate electricity for use such as by use 136.

A control 500 for the fans, as shown in FIGS. 3, 4A, 4B and 5 and 6, operates to control the clutches, or the variable guide vane, to achieve the desired power consumption or other operation.

Although embodiments of this invention have been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
   a plurality of fan rotors;
   a gas generator comprising:
     at least one compressor rotor;
     at least one gas generator turbine rotor;
     a combustion section; and
     a fan drive turbine downstream of the at least one gas generator turbine rotor, a shaft configured to be driven by said fan drive turbine, said shaft engaging gears to drive the plurality of fan rotors; and
   a system for controlling an amount of power supplied to said plurality of fan rotors;
   said system includes a plurality of clutches, a respective clutch of the plurality of clutches being between said shaft and each of said plurality of fan rotors that is selectively opened;
   each clutch of the plurality of clutches being configured to be opened to reduce power consumption by the gas turbine engine, said shaft also configured to drive an electric generator, each clutch of the plurality of clutches being configured to be opened to send more power to said electric generator; and
   a control configured to open at least one clutch of the plurality of clutches associated with at least one of said plurality of fan rotors when reduced power is needed for propulsion of said gas turbine engine, and to thus increase an amount of power sent to said electric generator.

2. The gas turbine engine as set forth in claim 1, wherein at least one clutch of the plurality of clutches is configured to be opened should it be determined that an associated fan rotor is damaged.

3. The gas turbine engine as set forth in claim 1, wherein said plurality of fan rotors also being provided with variable inlet guide vanes, with said variable inlet guide vanes configured to be adjusted to control the amount of power supplied to said plurality of fan rotors, said control also being configured to control said variable inlet guide vane to reduce the power utilized by at least some of said plurality of fan rotors when reduced power is necessary to increase the amount of power sent to said electric generator.

4. The gas turbine engine as set forth in claim 3, wherein said variable inlet guide vanes are configured to be adjusted to send more power to the electric generator.

5. A method of operating a gas turbine engine comprising:
   operating a gas generator including at least one compressor rotor and at least one gas generator turbine rotor and a combustion section, and driving a fan drive turbine by products of combustion from the gas generator, the fan drive turbine driving a shaft; said shaft engaging gears and driving a plurality of fan rotors; and controlling an amount of power utilized by said plurality of fan rotors; providing a plurality of clutches, positioning a respective clutch of the plurality of clutches between said shaft and each of said plurality of fan rotors, and opening or closing at least one clutch of the plurality of clutches to control the amount of power, opening at least one of said clutches to reduce power consumption by the gas turbine engine, said shaft also driving a generator to generate electricity; and wherein a control opens said at least one clutch of the plurality of clutches to send more power to said electric generator when less power is required for propulsion.

6. The method as set forth in claim 5, wherein a respective clutch of the plurality of clutches is opened when it is determined that an associated fan rotor is damaged.

7. The method as set forth in claim 5, wherein said fan rotors are provided with variable inlet guide vanes, and said variable inlet guide vanes being adjusted to control the amount of power.

8. The method as set forth in claim 7, wherein said variable inlet guide vanes are adjusted to send more power to the electric generator.

\* \* \* \* \*